(12) United States Patent
Wu (10) Patent No.: US 9,325,979 B2
(45) Date of Patent: Apr. 26, 2016

(54) 3D DISPLAY METHOD AND 3D DISPLAY DEVICE HAVING INCREASED VIEWING ANGLE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 285 days.

(21) Appl. No.: 13/985,146

(22) PCT Filed: Dec. 18, 2012

(86) PCT No.: PCT/CN2012/086862
§ 371 (c)(1),
(2) Date: Aug. 13, 2013

(87) PCT Pub. No.: WO2013/135083
PCT Pub. Date: Sep. 19, 2013

(65) Prior Publication Data
US 2014/0078272 A1     Mar. 20, 2014

(30) Foreign Application Priority Data

Mar. 16, 2012    (CN) .......................... 2012 1 0071632

(51) Int. Cl.
*H04N 13/04*        (2006.01)
*G02B 27/26*        (2006.01)
(Continued)

(52) U.S. Cl.
CPC ............ *H04N 13/0434* (2013.01); *G02B 27/26* (2013.01); *G09G 3/003* (2013.01); *H04N 13/0497* (2013.01); *G02F 1/136209* (2013.01);
(Continued)

(58) Field of Classification Search
CPC .................................................. H04N 13/0434
See application file for complete search history.

(56) References Cited

U.S. PATENT DOCUMENTS

| 2011/0116166 A1 | 5/2011 | Jung et al. |
| 2011/0279761 A1 | 11/2011 | Kong et al. |
| 2012/0013610 A1 | 1/2012 | Chae |

(Continued)

FOREIGN PATENT DOCUMENTS

| CN | 102063881 A | 5/2011 |
| CN | 102244798 A | 11/2011 |

(Continued)

OTHER PUBLICATIONS

Korean Office Action dated Sep. 4, 2014; Appl. No. 10-2013-7019785.

(Continued)

*Primary Examiner* — Sath V Perungavoor
*Assistant Examiner* — James Pontius
(74) *Attorney, Agent, or Firm* — Ladas & Parry LLP (57) ABSTRACT

A 3D display method and a display device are provided. The 3D display method includes: adjusting a data line input signal for a 3D display device, so that a black image is displayed on sub-pixel regions of a (4n−2)th (n is a natural number) row and a 4nth row of a display panel of the 3D display device; inputting parallactic image signals for a left eye and a right eye into sub-pixel regions in a (4n−3)th row and in a (4n−1)th row, respectively, so that a left-eye image, the black image and a right-eye image are displayed on the sub-pixel regions in sequence, and each of the sub-pixel regions includes at least one row of sub-pixel structural units.

15 Claims, 4 Drawing Sheets

(51) Int. Cl.
*G09G 3/00* (2006.01)
*G02F 1/1362* (2006.01)

(52) U.S. Cl.
CPC .... *G02F 1/136286* (2013.01); *G09G 2320/028* (2013.01); *H04N 2213/001* (2013.01)

(56) References Cited

U.S. PATENT DOCUMENTS

| | | | |
|---|---|---|---|
| 2012/0013656 A1 | 1/2012 | Chae | |
| 2012/0154392 A1* | 6/2012 | Kim et al. | 345/419 |
| 2013/0010217 A1 | 1/2013 | Kang | |

FOREIGN PATENT DOCUMENTS

| | | |
|---|---|---|
| CN | 102253526 A | 11/2011 |
| CN | 102340683 A | 2/2012 |
| CN | 102628999 A | 8/2012 |
| KR | 20110054834 A | 5/2011 |
| KR | 20110125734 A | 11/2011 |
| KR | 20120007268 A | 1/2012 |
| WO | 2012023492 A1 | 2/2012 |

OTHER PUBLICATIONS

International Preliminary Report on Patentability dated Sep. 16, 2014; PCT/CN2012/086862.
International Search Report mailed Mar. 28, 2013; PCT/CN2012/086862.
First Chinese Office Action dated May 29, 2013; Appln. No. 201210071632.8.
Second Chinese Office Action dated Oct. 15, 2013; Appln. No. 201210071632.8.
Third Chinese Office Action dated Jan. 20, 2014; Appln. No. 201210071632.8.
Extended European Search Report Appln. No. 12866401.8-1903/2827592 PCT/2012086862; Dated Oct. 26, 2015.

* cited by examiner

3D DISPLAY METHOD AND 3D DISPLAY DEVICE HAVING INCREASED VIEWING ANGLE

BACKGROUND

Embodiments of the present invention relate to a 3D display method and a 3D display device.

The principle of displaying a three-dimensional (3D) image is to make a left-eye picture be seen by the left eye of a viewer, and a right-eye picture be seen by his right eye, wherein the left-eye and right-eye pictures are a pair of stereoscopic images having a parallax, so that a three-dimensional stereoscopic image which is similar to a practical image of an object can be seen by the viewer.

Polarized glasses type stereoscopic display is a mainstream technology in the current stereoscopic display field, and a basic structure of this technology is to install a device capable of adjusting a polarization direction of emitting light in front of a display panel, so that the polarization direction of the emitting light from pixels is rotated. This device may be a phase difference plate, may also be a liquid crystal cell, or any other device capable of adjusting the polarization direction of emitting light from different pixels. Among these, a technology in which the phase difference plate is employed takes the favor. Its basic structure is that, the phase difference plate is attached to the display panel after it is precisely aligned thereto. With different regions on the phase difference plate, different phase delays can be produced, so that lights from different pixels emit in different polarization directions and a viewer can see a 3D effect when wearing the polarized glasses.

To see a good 3D picture, he or she has to be within the range of a visible angle, and therefore, the size of the visible angle determines the visual range for vertical viewing and the viewing effect of a 3D display. In prior art, on a thin film transistor array substrate of a 3D display device, there are formed gate scan lines and data scan lines, and a group of gate scan lines and a group of data scan lines which are adjacent define one of sub-pixel structural units. Each of the sub-pixel structural units comprises a thin film transistor and a sub-pixel electrode, and on the thin film transistor array substrate, there are disposed a plurality of sub-pixel structural units arranged in a matrix.

Figure 1:
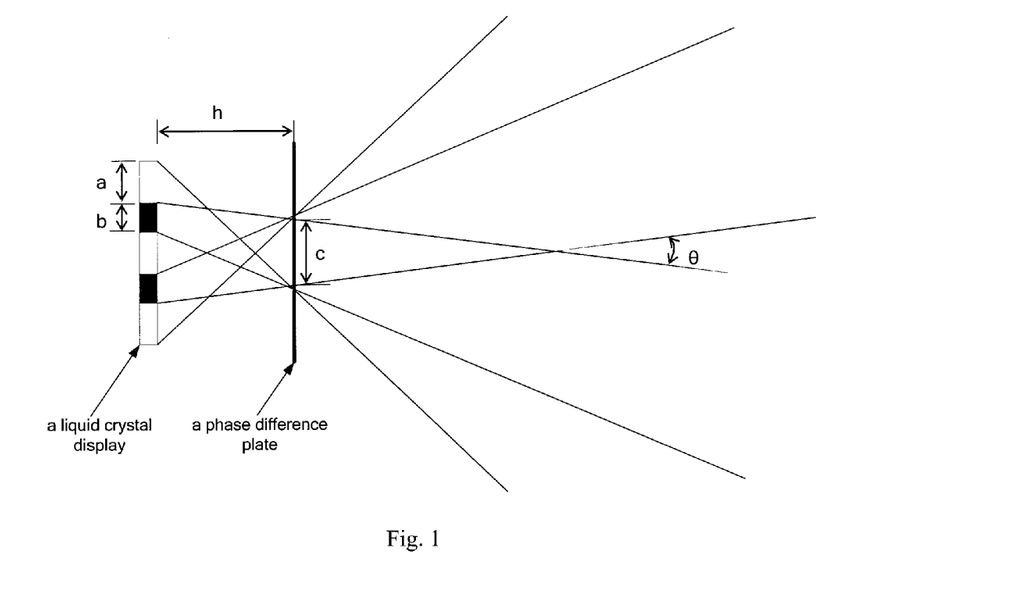
FIG. 1 is a calculation principle view of a visible angle of a 3D display device.

As shown in FIG. 1, a calculation formula of a visible angle θ of the 3D display device is:

$$\tan\frac{\theta}{2} = \frac{2p + b - 2c}{2h}$$

where, θ is the 3D visible angle, a is the height of a pixel electrode, b is the width of a light shielding region between two adjacent row pixel electrodes to which different image signals are applied, h is the distance from a display panel to a phase difference plate, c is the width of one stripe on the phase difference plate, p is the size of the pixel electrode structural unit and has a fixed value, wherein p=a+b.

In prior art, a 3D picture display is conducted by applying different parallactic image signals to pixel electrodes in adjacent rows, and an interval b between pixel electrode regions in two adjacent rows is only the width of a black matrix. Therefore, the visible angle of the 3D display is small, and the viewing range is relatively narrow.

SUMMARY

According to embodiments of the present invention, there are provided a 3D display method and a 3D display device, for increasing the visible angle of the 3D display device.

In an aspect, an embodiment of the invention provides a 3D display method, comprising: adjusting a data line input signal for a 3D display device, so that a black image is displayed on sub-pixel regions of a (4n−2)th (n is a natural number) row and a 4 nth row of a display panel of the 3D display device, inputting parallactic image signals for a left eye and a right eye into sub-pixel regions in a (4n−3)th row and in a (4n−1)th row, respectively, so that a left-eye image, the black image and a right-eye image are displayed on the sub-pixel regions in sequence, wherein each of the sub-pixel regions includes at least one row of sub-pixel structural units.

Optionally, for each of the sub-pixel regions in the (4n−2)th row, in the 4 nth row, in the (4n−3)th row and in the (4n−1)th row, there is one row of sub-pixel structural units.

Optionally, for each of the sub-pixel regions in the (4n−2)th row and in the 4 nth row, there is one row of sub-pixel structural units, and for each of the sub-pixel regions in the (4n−3)th row and in the (4n−1)th row, there are three rows of sub-pixel structural units.

In another aspect, an embodiment of the invention provides a 3D display device, comprising: a display panel, including a plurality of rows of sub-pixel regions which each includes at least one row of sub-pixel structural units; a signal controller, adapted to adjust a data line input signal for the 3D display device, so that a black image is displayed on the sub-pixel regions of a (4n−2)th (n is a natural number) row and a 4 nth row, and to input parallactic image signals for a left eye and a right eye into the sub-pixel regions in a (4n−3)th row and in a (4n−1)th row, respectively, so that a left-eye image, the black image and a right-eye image are displayed on the sub-pixel regions in sequence; and a light separation device, disposed on a light emitting side of the display panel and used to provide the left-eye image and the right-eye image to the left eye and the right eye, respectively.

Optionally, for each of the sub-pixel regions in the (4n−2)th row, in the 4 nth row, in the (4n−3)th row and in the (4n−1)th row, there is one row of sub-pixel structural units.

Optionally, for each of the sub-pixel regions in the (4n−2)th row and in the 4 nth row, there is one row of sub-pixel structural units, and for each of the sub-pixel regions in the (4n−3)th row and in the (4n−1)th row, there are three rows of sub-pixel structural units.

Optionally, all of the sub-pixel structural units of the display panel are sub-pixel structural units which are set normally.

Optionally, all of the sub-pixel structural units of the display panel are obtained by way of rotating the sub-pixel structural units which are set normally by 90 degrees.

Optionally, the sub-pixel structural units which are set normally are rectangles with the aspect ratio of 1:3, and long sides of the rectangles are parallel to data lines of the display panel Optionally, in the display panel, a gate scan line for one row of sub-pixel structural units, which is closest to the sub-pixel region in the 4 nth row, of the sub-pixel region in the (4n−1)th row or in a (4n+1)th row is disposed to be close to the sub-pixel region in the 4 nth row, so that the width of a black matrix area in a periphery of the sub-pixel region in the 4 nth row is increased.

Optionally, for each of the sub-pixel regions in the (4n−1)th row, in the 4 nth row and in the (4n+1)th row, there is one row of sub-pixel structural units According to the 3D display method provided by embodiments of the invention, the visual angle for 3D display is changed by way of adding a black display region between a left-eye image display and a right-eye image display, and in turn, the visual range of a 3D display device is increased.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

A method provided by an embodiment of the invention is used mainly for a 3D display device. The display principle of the 3D display device is to make a left-eye image be seen by the left eye of a viewer, and a right-eye image be seen by his right eye, wherein the left-eye and right-eye images are a pair of stereoscopic images having a parallax, so that a three-dimensional stereoscopic image which is similar to a practical image of the object can be seen by the viewer. To see a good 3D picture, he or she has to be within the range of a visible angle. Therefore, the size of the visible angle determines the visual range for vertical viewing and the viewing effect of the 3D display device.

In order that the visible angle of the 3D display device can be enlarged, according to an embodiment of the invention, there is provided a 3D display method, comprising: adjusting a data line input signal for the 3D display device, so that a black image is displayed on sub-pixel regions of a (4n−2)th row and a 4n-th (n is a natural number) row of a display panel of the 3D display device; inputting parallactic image signals for a left eye and a right eye into sub-pixel regions in a (4n−3)th row and in a (4n−1)th row, so that a left-eye image, the black image and a right-eye image are displayed on the sub-pixel regions in sequence, wherein each of the sub-pixel regions includes at least one row of sub-pixel structural units.

Figure 2:
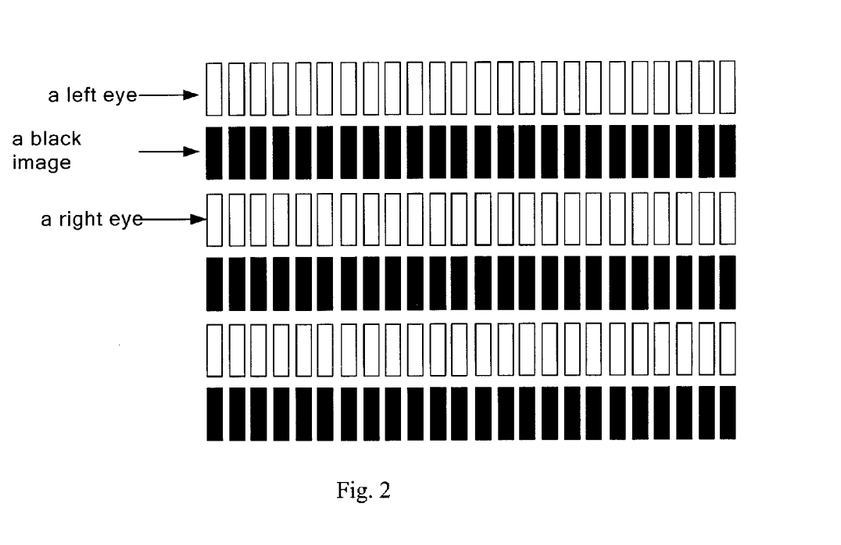
FIG. 2 is a view showing a display method for a 3D display device according to an embodiment of the invention.

Exemplarily, for each of the sub-pixel regions in the (4n−2)th row, in the 4 nth row, in the (4n−3)th row and in the (4n−1)th row, there is one row of sub-pixel structural units, which may correspond to the case shown in FIG. 2.

Figure 3:
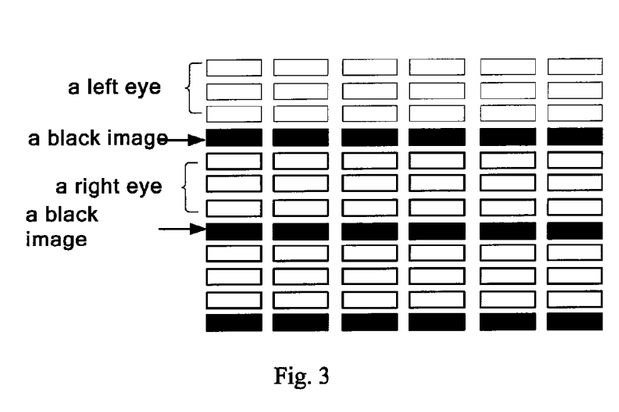
FIG. 3 is a view showing another display method for a 3D display device according to an embodiment of the invention.

Exemplarily, for each of the sub-pixel regions in the (4n−2)th row and in the 4 nth row, there is one row of sub-pixel structural units, and for each of the sub-pixel regions in the (4n−3)th row and in the (4n−1)th row, there are three rows of sub-pixel structural units (this may correspond to the case shown in FIG. 3). Because there are three rows of sub-pixel structural units for each of the sub-pixel regions in the (4n−3)th row and in the (4n−1)th row, each row of sub-pixel structural units may correspond to one color in three primary colors of RGB. Thus, it has a better display effect.

Where, all sub-pixel structural units of a display panel shown in FIG. 2 are sub-pixel structural units which are normally set, while all sub-pixel structural units of a display panel shown in FIG. 3 are obtained by way of rotating the sub-pixel structural units which are normally set by 90 degrees. Generally speaking, the above sub-pixel structural units which are normally set are usually rectangles, and long sides of the rectangles are parallel to data lines of the display panel. Generally, the ratio of length and width of the rectangles can be set according to a practical design, for example, the ratio of length and width being 1:3 is a relatively common.

It is to be noted that, regarding the 3D display method according to the embodiment of the invention, there is no limitation on specific structure and type of the 3D display device to which it applied, that is, all 3D display devices can adopt the display method according to the embodiment of the invention.

The 3D display method provided by an embodiment of the invention may be used in a liquid crystal display device, or may also be applied to an Electrical Lighting (EL) display device or a Plasma Display Panel (PDP) display device. Its application to the 3D display device will be specifically described below as an example.

On the basis of the display principle of a liquid crystal display device, in order that the visible angle of the liquid crystal display device can be enlarged, according to an embodiment of the invention, there is provided a display method for a 3D display device, comprising: for a thin film transistor array substrate having a plurality of sub-pixel structural units arranged in a matrix, adjusting a voltage applied to a sub-pixel region, so that a black image is displayed on the sub-pixel regions of a (4n−2)th (n is a natural number) row and a 4 nth row; inputting parallactic image signals for a left eye and a right eye into the sub-pixel regions in a (4n−3)th row and in a (4n−1)th row, so that a left-eye image, the black image and a right-eye image are displayed on the sub-pixel regions in sequence.

It is to be noted that, the sub-pixel structural units in the embodiment of the invention are arranged in a matrix, a plurality of rows of sub-pixel structural units may be included in each of the sub-pixel regions, and a row number of the sub-pixel structural units included in the sub-pixel regions of the (4n−2)th (n is a natural number) row and the 4 nth row may be different from a row number of the sub-pixel structural units included in the sub-pixel regions of the (4n−3)th row and the (4n−1)th row.

Further, each of the sub-pixel regions includes at least one row of sub-pixel structural units. One of the sub-pixel structural units is a region defined by crossing of a group of gate scan lines and a group of data scan lines which are adjacent on the thin film transistor array substrate, and the ratio of length and width of the sub-pixel structural unit is 1:3.

As shown in FIG. 2, the description will be given below to an example in which each of the sub-pixel regions includes one row of sub-pixel structural units.

For a plurality of sub-pixel structural units which are formed on a thin film transistor array substrate and arranged in a matrix, sub-pixel regions in a (4n−2)th (n is a natural number) row and in a 4 nth row are made to display a black image, and parallactic image signals for a left eye and a right eye are respectively input into sub-pixel regions in a (4n−3)th row and in a (4n−1)th row, so that a left-eye image, the black image and a right-eye image are displayed on the sub-pixel regions in sequence. Exemplarily, by means of regulating and controlling input voltages to the sub-pixel regions in the (4n−2)th row and in the 4 nth row, the (4n−2)th row and the 4 nth row are made to display the black image. Meanwhile, the parallactic image signals for the left eye and the right eye are input into the sub-pixel regions in the (4n−3)th row and in the (4n−1)th row, respectively, and the left-eye image and the right-eye image are displayed on the sub-pixel regions of the (4n−3)th row and the (4n−1)th row, respectively. That is, among the sub-pixel regions, the sub-pixel regions in 1st, 5th and 9th rows show the left-eye image, the sub-pixel regions in 2nd, 4th and 6th rows show the black image, and the sub-pixel regions in 3nd, 7th and 11th rows show the right-eye image. Eventually, an effect that the left-eye image, the black image and the right-eye image are displayed on the sub-pixel regions in sequence is obtained, so that when a viewer sees, the left-eye image is seen by his left eye, and the right-eye image is seen by his right eye. Here, the left-eye and right-eye images are a pair of stereoscopic images having a parallax, so that a three-dimensional stereoscopic image which is similar to a practical image of the object can be seen by the viewer.

Because one row of the sub-pixel regions, in which the black image is displayed, is provided between a display region for the left eye and a display region for the right eye, the width of a display region for the black image which is located between the region for the left-eye image and the region for the right-eye image is increased, i.e. value of b is increased by P (the width of one sub-pixel structural unit), and in turn, a visible angle θ is increased. Thus, the range of the visible angle of the 3D liquid crystal display is increased.

Alternatively, according to an embodiment of the invention, there is provided another display method for a 3D liquid crystal display device, comprising: a work voltage for sub-pixel regions is adjusted after a plurality of sub-pixel structural units on a thin film transistor array substrate in the liquid crystal display device are rotated by 90 degrees, so that the sub-pixel regions in a (4n−2)th (n is a natural number) row and in a 4 nth row show a black image, and parallactic image signals for a left eye and a right eye are input into the sub-pixel regions in a (4n−3)th row and in a (4n−1)th row, respectively, so that a left-eye image, the black image and a right-eye image are displayed on the sub-pixel regions in sequence.

Specifically, upon formation of the sub-pixel structural units on the substrate, all of the sub-pixel structural units, each of which is a region defined by crossing of a group of gate scan lines and a group of data scan lines which are adjacent on the thin film transistor array substrate, are rotated by 90 degrees, and the aspect ratio of the sub-pixel structural units after rotation is 3:1. For the thin film transistor array substrate after rotation, the sub-pixel regions in the (4n−2)th (n is a natural number) row and in the 4 nth row show a black image, and the parallactic image signals for the left eye and the right eye are input into the sub-pixel regions in the (4n−3)th row and in the (4n−1)th row, respectively, so that the left-eye image, the black image and the right-eye image are displayed on the sub-pixel regions in sequence.

Exemplarily, as shown in FIG. 3, in the embodiment of the invention, the description will be given to an example in which the sub-pixel regions in the (4n−2)th row and in the 4 nth row include one row of sub-pixel structural units and the sub-pixel regions in the (4n−3)th row and in the (4n−1)th row include three rows of sub-pixel structural units.

For a plurality of sub-pixel structural units which are formed on the thin film transistor array substrate and arranged in a matrix, the sub-pixel regions in a (4n−2)th (n is a natural number) row and in a 4 nth row are made to display the black image, and the parallactic image signals for the left eye and the right eye are respectively input into the sub-pixel regions in a (4n−3)th row and in a (4n−1)th row, so that the left-eye image, the black image and the right-eye image are displayed on the sub-pixel regions in sequence. That is, among the sub-pixel regions, the sub-pixel regions in 1st, 5th and 9th rows show the left-eye image, the sub-pixel regions in 2nd, 4th and 6th rows show the black image, and the sub-pixel regions in 3nd, 7th and 11th rows show the right-eye image. Eventually, an effect that the left-eye image, the black image and the right-eye image are displayed on the sub-pixel regions in sequence is obtained, so that when a viewer sees, the left-eye image is seen by his left eye, and the right-eye image is seen by his right eye. Here, the left-eye and right-eye images are a pair of stereoscopic images having a parallax, so that a three-dimensional stereoscopic image which is similar to a practical image of the object can be seen by the viewer.

In addition, the sub-pixel regions in the (4n−3)th row and in the (4n−1)th row include three rows of sub-pixel structural units, wherein, three primary colors of red, green and blue are displayed on the sub-pixel structural units for these sub-pixel regions in a row unit. The sub-pixel regions in the (4n−2)th row and in the 4 nth row include one row of sub-pixel structural units for displaying of the black image, and all of the sub-pixel structural units are rotated by 90 degrees, so that the aspect ratio of the sub-pixel structural units after rotation is 3:1. So, in this case, the widths of a display region for the left-eye image and a display region for the right-eye image each is 3*P/3, and as compared to prior art, the width of a display region for the black image is increased by P/3 (the width of one sub-pixel structural unit), so that the visible angle is increased. Thus, the range of the visible angle of the 3D liquid crystal display is increased. Furthermore, as compared to the foregoing display method, the resolution of the 3D liquid crystal display is further enhanced, and the display effect of pictures is better.

According to the embodiment of the invention, there is provided a display method for a 3D display device, the visible angle of the 3D display device is increased by way of increasing width of a display region for the black image which is located between a region for the left-eye image and a region for the right-eye image of a display panel of the 3D display device, and in turn, the visual range of the 3D display device is increased.

Embodiment 2

Figure 6:
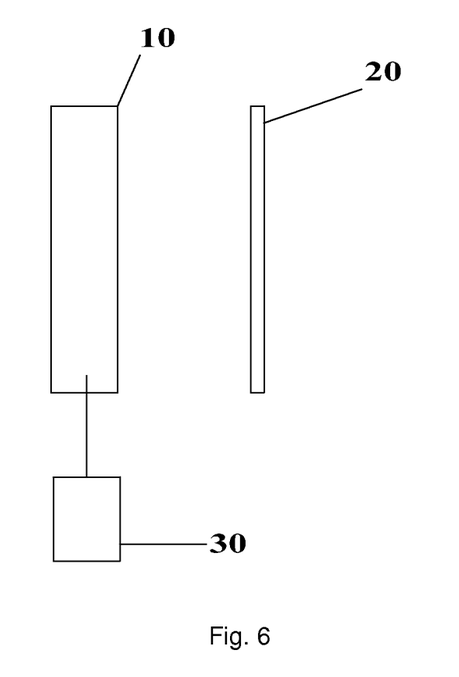
FIG. 6 is a schematic view of a 3D display device according to an embodiment of the present invention.

According to an embodiment of the invention, there is provided a 3D display device, as shown in FIG. 6, comprising a display panel 10, a signal controller 30 and a light separation device 20 disposed on a light emitting side of the display panel and used to provide the left-eye image and the right-eye image to the left eye and the right eye, respectively, wherein the display panel 10 includes a plurality of rows of sub-pixel regions, each of the sub-pixel regions includes at least one row of sub-pixel structural units; and the signal controller 30 acts to adjust a data line input signal for the 3D display device, so that a black image is displayed on the sub-pixel regions of a (4n−2)th (n is a natural number) row and a 4nth row, and to input parallactic image signals for a left eye and a right eye into the sub-pixel regions in a (4n−3)th row and in a (4n−1)th row, respectively, so that a left-eye image, the black image and a right-eye image are displayed on the sub-pixel regions in sequence.

The signal controller 30 may be a data signal driver in a general display device, or an additional control chip capable of achieving input control of the above signals may also be used.

Exemplarily, for each of the sub-pixel regions in the (4n−2)th row, in the 4 nth row, in the (4n−3)th row and in the (4n−1)th row, there is one row of sub-pixel structural units.

Exemplarily, for each of the sub-pixel regions in the (4n−2)th row and in the 4 nth row, there is one row of sub-pixel structural units, and for each of the sub-pixel regions in the (4n−3)th row and in the (4n−1)th row, there are three rows of sub-pixel structural units.

Exemplarily, in the 3D display device according to an embodiment of the invention, all of the sub-pixel structural units of the display panel are sub-pixel structural units which are normally set, or alternatively, all of the sub-pixel structural units of the display panel are obtained by way of rotating the sub-pixel structural units which are normally set by 90 degrees.

Optionally, the sub-pixel structural units which are normally set may be rectangles with the aspect ratio of 1:3. Exemplarily, a long side of the rectangle is parallel to data lines of the display panel. Exemplarily, the long side of the rectangle may also be parallel to scan lines of the display panel.

Optionally, in the display panel, it is possible that a gate scan line for the sub-pixel region in the (4n−1)th row or in a (4n+1)th row is disposed to be close to the sub-pixel region in the 4 nth row, or, it is possible that a gate scan line for sub-pixel structural units, which are close to the sub-pixel region in the 4 nth row, of the sub-pixel region in the (4n−1)th row or in the (4n+1)th row is disposed close to the sub-pixel region in the 4 nth row, so as to increase the width of the sub-pixel region in the 4 nth row.

The 3D display device according to the embodiment of the invention may be a 3D liquid crystal display device, or may also be a 3D, ElectroLuminescent (EL) device or a Plasma Display Panel (PDP) display device. The 3D liquid crystal display device will be specifically described below as an example.

Figure 4:
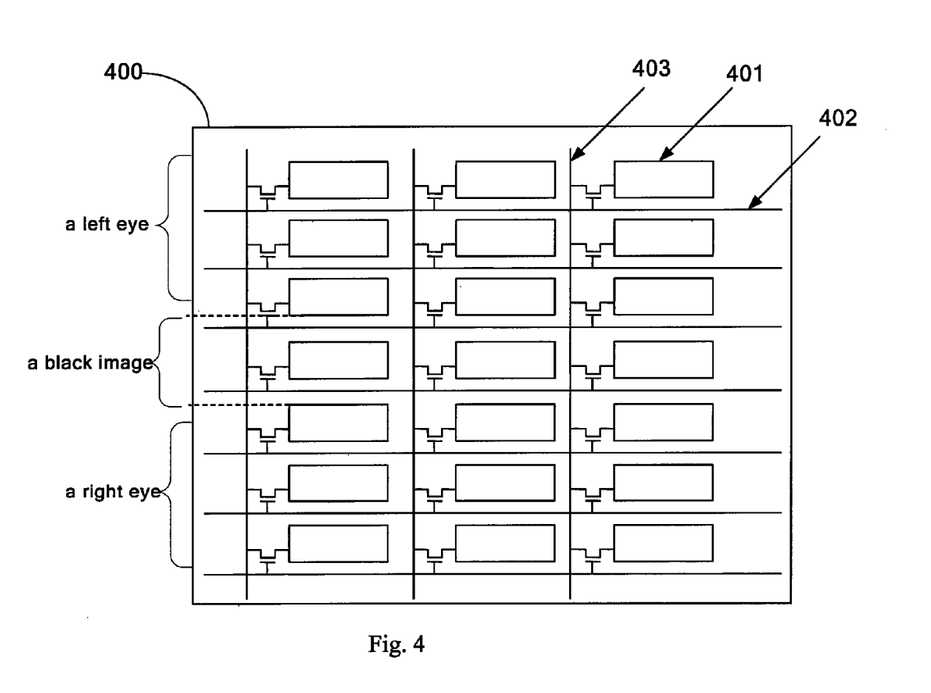
FIG. 4 is a schematic view showing a structure of a thin film transistor array substrate according to an embodiment of the invention.

Exemplarily, according to an embodiment of the invention, there is provided a 3D liquid crystal display device which comprises a liquid crystal panel, the liquid crystal panel including a thin film transistor array substrate. As shown in FIG. 4, the thin film transistor array substrate includes a substrate 400 and a plurality of sub-pixel structural units 401 which is disposed on the substrate and arranged in a matrix. A black image is displayed on sub-pixel regions of a (4n−2)th (n is a natural number) row and a 4 nth row, and parallactic image signals for a left eye and a right eye are input into sub-pixel regions in a (4n−3)th row and in a (4n−1)th row, respectively, so that a left-eye image, the black image and a right-eye image are displayed on the sub-pixel regions in sequence.

Exemplarily, each of the sub-pixel regions includes at least one row of the sub-pixel structural units, each of which is a region defined by crossing of a group of gate scan lines 402 and a group of data scan lines 403 which are adjacent on the thin film transistor array substrate, and the aspect ratio of the sub-pixel structural units is 1:3.

Optionally, among the plurality of sub-pixel structural units, it is possible that a gate scan line for the sub-pixel region in the (4n−1)th row or in a (4n+1)th row is adjusted so that the gate scan line for the sub-pixel region in the (4n−1)th row or in the (4n+1)th row are close to the sub-pixel region in the 4 nth row, so as to increase the width of the sub-pixel region in the 4 nth row; or, it is possible that a gate scan line for sub-pixel structural units, which are close to the sub-pixel region in the 4 nth row, of the sub-pixel region in the (4n−1)th row or in the (4n+1)th row is adjusted to be close to the sub-pixel region in the 4 nth row, so as to increase width of the sub-pixel region in the 4 nth row.

Figure 5:
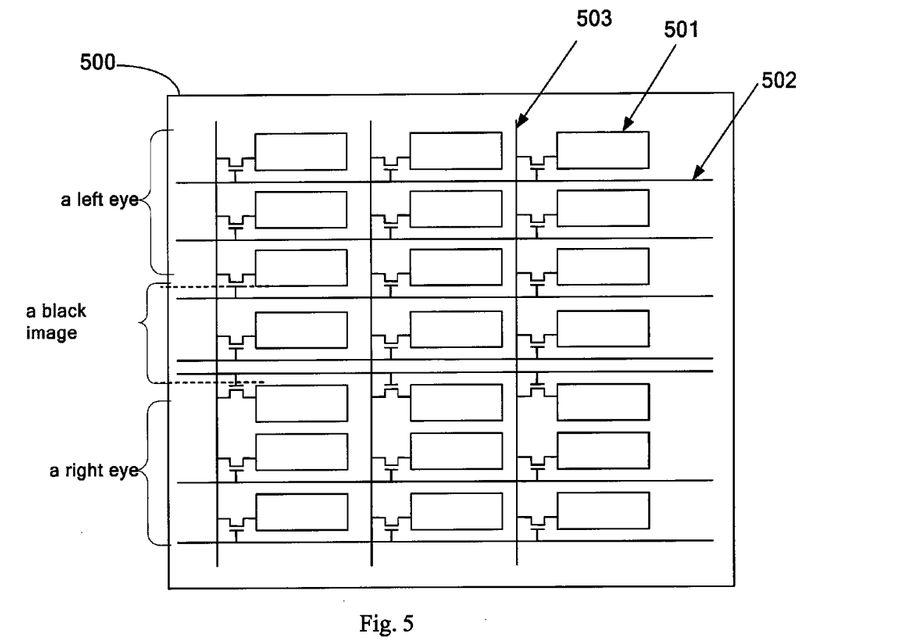
FIG. 5 is a schematic view showing another structure of a thin film transistor array substrate according to an embodiment of the invention.

Exemplarily, as shown in FIG. 5, on the thin film transistor array substrate 500, a plurality of sub-pixel structural units 501 which is set as being rotated by 90 degrees are included, and the description will be given to an example in which three rows of sub-pixel structural units are included in each of sub-pixel regions of the (4n−3)th row and the (4n−1)th row and one row of sub-pixel structural units is included in each of sub-pixel regions of the (4n−2)th row and the 4 nth row. Here, a left-eye image is displayed on the sub-pixel regions of 1st, 5th and 9th rows, a black image is displayed on the sub-pixel regions of 2nd, 4th and 6th rows, and a right-eye image is displayed on the sub-pixel regions of 3nd, 7th and 11th rows.

Specifically, a gate scan line 502 for one row of sub-pixel structural units, which is closest to the sub-pixel region in the 4 nth row, of the sub-pixel region in the (4n−1)th row or in a (4n+1)th row is adjusted into the sub-pixel region in the 4 nth row, and data scan lines 503 remain unchanged. In this way, the gate scan line for this row of sub-pixel structural units is close to the sub-pixel region in the 4 nth row, so that the width of a black matrix area in a periphery of the sub-pixel region in the 4 nth row is increased. That is, gate scan lines for respective sub-pixel structural units rows, which are closest to respective sub-pixel regions in 4 nth rows, of the sub-pixel regions in 3nd, 5th, 7th, 9th, . . . rows are adjusted to the respective sub-pixel regions in 4 nth rows. When images are displayed, the widths of the sub-pixel regions in 4 nth rows are increased.

Regarding the 3D display device provided by the embodiment of the invention, in case of a 3D display, between a left-eye image display and a right-eye image display, the width of a black display region is increased, so as to increase the visual angle of the 3D display device, and in turn, the visual range of the 3D display device is increased.

It is to be noted that, if the 3D display device provided by the embodiment of the invention is an EL display device, a PDP display device or any other display device, it is necessary that a polarizer is added to a light emitting side of the display panel so as to generate polarized light, and then a 3D display effect is achieved by a phase difference plate for implementing 3D display which is disposed on a light emitting side of the polarizer.

The forgoing are merely specific embodiments of the invention, but the protection scope of the invention is not limited thereto. All changes or replacements, which would be obvious to any of those skilled in the art, within the technical scope disclosed by the invention shall be encompassed within the protection scope of the invention. Therefore, the protection scope of the invention shall be defined by the protection scope of claims.

It should be understood by those skilled in the art that various changes and modifications may be made in these embodiments without departing from the scope and spirit of the present invention. If these changes and modifications fall into the range of the claims and their equivalents, the present invention also is directed to include these changes and modifications.

What is claimed is:

1. A 3D display method, comprising:
adjusting a data line input signal for a 3D display device, so that a black image is displayed on sub-pixel regions of a (4n−2)th (n is a natural number) row and a 4nth row of a display panel of the 3D display device, inputting parallactic image signals for a left eye and a right eye into sub-pixel regions respectively in a (4n−3)th row and in a (4n−1)th row, so that a left-eye image, the black image and a right-eye image are displayed on the sub-pixel regions in sequence,
wherein each of the sub-pixel regions includes at least one row of sub-pixel structural units,
wherein, in the display panel, a gate scan line for one row of sub-pixel structural units, which is closest to the sub-pixel region in the 4nth row, of the sub-pixel region in the (4n−1)th row or in a (4n+1)th row is disposed into the sub-pixel region in the 4nth row, so that the width of a black matrix area in a periphery of the sub-pixel region in the 4nth row is increased.

2. The display method claimed as claim 1, wherein for each of the sub-pixel regions in the (4n−2)th row, in the 4nth row, in the (4n−3)th row and in the (4n−1)th row, there is one row of sub-pixel structural units.

3. The display method claimed as claim 1, wherein for each of the sub-pixel regions in the (4n−2)th row and in the 4nth row, there is one row of sub-pixel structural units, and for each of the sub-pixel regions in the (4n−3)th row and in the (4n−1)th row, there are three rows of sub-pixel structural units.

4. The display method claimed as claim 1, wherein all of the sub-pixel structural units of the display panel are sub-pixel structural units which are set normally,
alternatively, all of the sub-pixel structural units of the display panel are obtained by way of rotating the sub-pixel structural units which are set normally by 90 degrees.

5. The display method claimed as claim 4, wherein the sub-pixel structural units which are set normally are rectangles with the aspect ratio of 1:3, and long sides of the rectangles are parallel to data lines of the display panel.

6. The display method claimed as claim 1, wherein for each of the sub-pixel regions in the (4n−1)th row, in the 4nth row and in the (4n+1)th row, there is one row of sub-pixel structural units.

7. A 3D display device, comprising:
a display panel, including a plurality of rows of sub-pixel regions, each of the plurality of rows of sub-pixel regions including at least one row of sub-pixel structural units;
a signal controller, adapted to adjust a data line input signal for the 3D display device, so that a black image is displayed on the sub-pixel regions of a (4n−2)th (n is a natural number) row and a 4nth row, and to input parallactic image signals for a left eye and a right eye into the sub-pixel regions respectively in a (4n−3)th row and in a (4n−1)th row, so that a left-eye image, the black image and a right-eye image are displayed on the sub-pixel regions in sequence,
wherein in the display panel, a gate scan line for one row of sub-pixel structural units, which is closest to the sub-pixel region in the 4nth row, of the sub-pixel region in the (4n−1)th row or in a (4n+1)th row is disposed into the sub-pixel region in the 4nth row, so that the width of a black matrix area in a periphery of the sub-pixel region in the 4nth row is increased.

8. The 3D display device claimed as claim 7, wherein for each of the sub-pixel regions in the (4n−2)th row, in the 4nth row, in the (4n−3)th row and in the (4n−1)th row, there is one row of sub-pixel structural units.

9. The 3D display device claimed as claim 7, wherein a row number of the sub-pixel structural units included in the sub-pixel regions of the (4n−2)th row and the 4nth row is different from a row number of the sub-pixel structural units included in the sub-pixel regions of the (4n−3)th row and in the (4n−1)th row.

10. The 3D display device claimed as claim 9, wherein for each of the sub-pixel regions in the (4n−2)th row and in the 4nth row, there is one row of sub-pixel structural units, and for each of the sub-pixel regions in the (4n−3)th row and in the (4n−1)th row, there are three rows of sub-pixel structural units.

11. The 3D display device claimed as claim 7, wherein all of the sub-pixel structural units of the display panel are sub-pixel structural units which are set normally,
alternatively, all of the sub-pixel structural units of the display panel are obtained by way of rotating the sub-pixel structural units which are set normally by 90 degrees.

12. The 3D display device claimed as claim 11, wherein the sub-pixel structural units which are set normally are rectangles with the aspect ratio of 1:3, and long sides of the rectangles are parallel to data lines of the display panel.

13. The 3D display device claimed as claim 7, wherein for each of the sub-pixel regions in the (4n−1)th row, in the 4nth row and in the (4n+1)th row, there is one row of sub-pixel structural units.

14. The 3D display device claimed as claim 7, wherein the 3D display device is an electroluminescent display device or a plasma display device.

15. The 3D display device claimed as claim 14, wherein the 3D display device further comprises:
a light separation device, disposed on a light emitting side of the display panel and used to provide the left-eye image and the right-eye image to the left eye and the right eye, respectively; and
a polarizer between the display panel and the light separation device.

* * * * *